United States Patent
Hamilton et al.

(10) Patent No.: US 11,761,803 B2
(45) Date of Patent: Sep. 19, 2023

(54) SENSOR DIAGNOSTICS

(71) Applicant: Schneider Electric Systems USA, Inc., Foxboro, MA (US)

(72) Inventors: Gordon Hamilton, South Yarmouth, MA (US); Roza Tesfaye, Dedham, MA (US)

(73) Assignee: Schneider Electric Systems USA, Inc., Foxborough, MA (US)

(*) Notice: Subject to any disclaimer, the term of this patent is extended or adjusted under 35 U.S.C. 154(b) by 284 days.

(21) Appl. No.: 17/235,712

(22) Filed: Apr. 20, 2021

(65) Prior Publication Data
US 2022/0333964 A1    Oct. 20, 2022

(51) Int. Cl.
*G01F 1/60*    (2006.01)
*G01F 1/64*    (2006.01)

(52) U.S. Cl.
CPC . *G01F 1/64* (2013.01); *G01F 1/60* (2013.01)

(58) Field of Classification Search
CPC .......... G01F 1/3287; G01F 1/60; G01F 15/06; G01F 15/061; G01F 15/063
See application file for complete search history.

(56) References Cited

U.S. PATENT DOCUMENTS

| | | | |
|---|---|---|---|
| 7,148,588 B2 * | 12/2006 | Frohlich | G01F 1/667 307/106 |
| 7,921,733 B2 | 4/2011 | Foss et al. | |
| 2008/0258736 A1 | 10/2008 | Schulz et al. | |
| 2021/0072053 A1 | 3/2021 | Ameri et al. | |

FOREIGN PATENT DOCUMENTS

EP    0546855 A1    6/1993

OTHER PUBLICATIONS

Extended European Search Report and Search Opinion dated Sep. 8, 2022 for corresponding European Patent Application No. EP22168423.6, 8 pages.

* cited by examiner

*Primary Examiner* — Erika J. Villaluna
(74) *Attorney, Agent, or Firm* — Locke Lord LLP (57) ABSTRACT

A flow transmitter method and system involves obtaining, via a flow sensor, sensor measurements of flow characteristics of a moving medium; outputting, via a processor, a drive signal for driving a pulse output circuit to generate a pulse signal according to the sensor measurements from the sensor; and generating, via a switching circuit of a pulse output circuit, a pulse signal according to the drive signal. The method and system further involve monitoring, via a diagnostic circuit connected to the switching circuit, current corresponding to the pulse signal; and determining, via the processor, whether the output circuit is operating in a normal or abnormal state based on the drive signal from the processor and a feedback signal corresponding to the monitored current from the diagnostic circuit.

13 Claims, 5 Drawing Sheets

SENSOR DIAGNOSTICS

FIELD

The present disclosure is generally directed to sensor diagnostics, and more particularly, to performing diagnostics of flow sensors and their transmitters when connected to an external device.

BACKGROUND

Sensor or monitoring devices such as a flow meter (also referred to as "flowmeter" or "flow sensor") can provide information about fluid, such as liquid, gas and steam, moving through a conduit, such as employed in an industrial process(es). The information can include a measurement of a volume flow or flow rate, mass and density of the fluid moving through the conduit, using for example magnetic, vortex, Coriolis or other flow measurement techniques or technologies. Mass flowmeters can provide a measurement of the mass of material being transferred through a conduit. Similarly, density flowmeters, or densitometers, can provide a measurement of the density of material flowing through a conduit. Mass flowmeters also may provide a measurement of the density of the material. A flow transmitter can, for example, refer to a flow meter with electronic components, which can provide an electrical output in the form of electrical pulses of pulse signal(s) (e.g., in the range of 1-5V or 4-20 mA or other ranges depending on the application) or some fieldbus output to an external monitoring system, controller or other system.

SUMMARY

In accordance with an embodiment, a method and system is provided for performing diagnostic of a flow transmitter system. The method and system involve obtaining, via a flow sensor, sensor measurements of flow characteristics of a moving medium being monitored; outputting, via at least one processor, a drive signal for driving a pulse output circuit to generate a pulse signal according to the sensor measurements from the flow sensor; generating, via a switching circuit of a pulse output circuit, a pulse signal according to the drive signal. The method and system further involve monitoring, via a diagnostic circuit connected to the switching circuit, current corresponding to the pulse signal; and determining, via the at least one processor, whether the pulse output circuit is operating in a normal or abnormal state based on the drive signal from the at least one processor and a feedback signal corresponding to the monitored current from the diagnostic circuit. In various embodiments, the flow characteristics can include a flow rate of the moving medium or a density of the moving medium.

In accordance with an embodiment, the determining operation compares the drive signal from the at least one processor to the feedback signal corresponding to the monitored current from the diagnostic circuit to determine whether the pulse output circuit is operating in a normal or abnormal state.

In accordance with an embodiment, the pulse signal also may be outputted to or obtained by an external device with a power supply which supplies power to the pulse output circuit when connected to the flow transmitter system. In an embodiment, the external device can operate as an electronic switch when connected to the pulse output circuit.

In accordance with an embodiment, the switching circuit of the pulse output circuit comprises at least one transistor (e.g., FET, bipolar transistor, etc.) which is powered by the power supply of the external device and driven according to the drive signal from the at least one processor. The diagnostic circuit can include a circuit of high gain bandwidth amplifier or amplifiers for providing the feedback signal to the at least one processor. The feedback signal can correspond to current drawn from the power supply of the external device when the at least one transistor is driven to turn or switch ON and OFF according to the drive signal from the at least one processor.

In accordance with an embodiment, the method and system can further involve conducting communication with a remote device via a communication device of the flow transmitter system which is separate from the pulse output circuit. The at least one processor is configured to selectively output information corresponding to the sensor measurement via the communication device or via the pulse output circuit. The at least one processor, the flow sensor and the communication device are powered by a power supply that is different from the power supply of the external device.

In accordance with an embodiment, the pulse output circuit can include the switching circuit for generating pulse signal(s), and protection circuitry comprising isolation and/or current limiting circuits for intrinsically safe operations.

In accordance with an embodiment, the at least one processor can determine whether the pulse output circuit is operating in a normal or abnormal state in order to verify a rate of the pulse signal output to the external device or to determine a health of the connection of the external device to the flow transmitter system or components thereof. The method and system can further involve reporting, via a communication device, to a remote device or system information regarding a faulty output pulse circuit or a faulty connection to the external device, based on the determination by the at least one processor.

DESCRIPTION OF THE FIGURES

The description of the various example embodiments is explained in conjunction with the appended drawings.

DISCUSSION OF EXAMPLE EMBODIMENTS

A flow transmitter system and method are provided, which can perform diagnostics when the system or components thereof. The system can include a plurality of components including a sensor, a pulse output circuit, a diagnostic circuit and at least one processor. The sensor can sense flow characteristics of a medium, such as for example fluid and/or gas moving through a conduit or other structure. The processor can generate a drive signal according to sensor measurements from the sensor corresponding to the flow characteristics. The pulse output circuit can generate an electrical pulse signal(s) according to the drive signal, and output the electrical pulse signal(s) to an external device or other device or system. The diagnostic circuit, which is connected to a switching circuit of the pulse output circuit, can monitor current or current measurement corresponding to the electrical pulse signal(s) and return to the processor a feedback signal corresponding to the monitored current or current measurement. Thereafter, the processor can determine whether the pulse output circuit of the flow transmitter system is operating in a normal state (e.g., acceptable operating parameter(s) or threshold(s)) or abnormal state based on the feedback signal (or feedback information) corresponding to the monitored current or current measurement from the diagnostic circuit, when the external device is connected to the flow transmitter system. The information concerning the state of the pulse output circuit and operations and components associated therewith can be reported to a remote device or system or a user.

For example, the processor can evaluate the feedback signal from the diagnostic circuit and the drive signal from the processor to determine whether a fault or other abnormal operating condition(s) exists or not in relations to the pulse output circuit of the flow transmitter system. When the feedback signal and the drive signal do not match, there is a potential error or fault associated with the pulse output circuit and/or operations or components associated therewith.

Accordingly, the method and system can be used to detect and report the current in the connection to the external device, which supplies power to the pulse output circuit. The method and system can allow determination of potential faulty installation such as the health of the external connection, and also can allow determination of subsequent faults that may occur related to the external connection. The method and system can reduce time to troubleshoot problems with the connection to the external device. The method and system can also verify that the correct rate of pulse outputs is actually sent to the external device.

In some embodiments, the external device can supply power to one or more of the plurality of components, such as the pulse output circuit, when the external device is connected to the flow transmitter system. In some embodiments, the diagnostic circuit can be added to existing transmitters to provide diagnostic information about the installation and operation of external equipment connected to the transmitter, such as for a flow transmitter or other pulse-based sensor transmitter system. The diagnostic circuit can include, for example, an amplifier or amplification circuits, which can be added/coupled to or integrated with the pulse output circuit or its switching circuit (e.g., transistor circuit(s)). In some embodiments, the diagnostic circuit can sample and convert a current signal (from the switching circuit of the pulse output circuit) to a voltage signal and amplify the voltage signal, which is feedback to the processor as a digital signal.

These and other example sensor diagnostic features of the present disclosure are described below with reference to the Figures.

Figure 1:
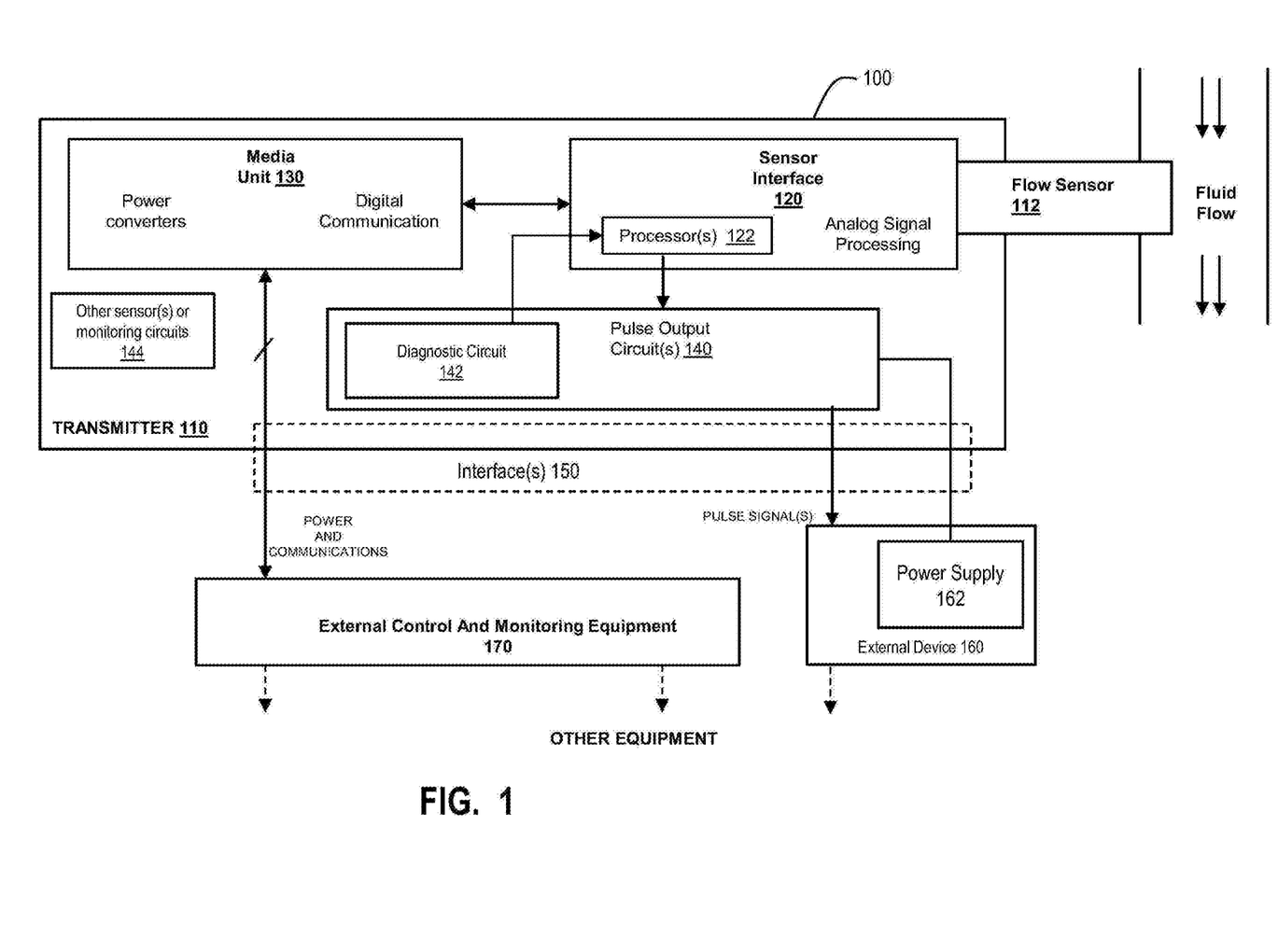
FIG. 1 is a block diagram of example components of a flow transmitter system (also referred to as a flow transmitter or a flow meter with a transmitter), having a diagnostic circuit for use in diagnosing potential issues with the pulse output circuit and connections thereto, in accordance with an embodiment.

FIG. 1 is an example flow transmitter system 100 for monitoring and transmitting flow characteristics of a medium to be monitored. The medium can include fluid, gas or a combination thereof flowing through a conduit or other structure, or other moving materials. The flow transmitter system 100 can be employed as part of an industrial process or system, and can operate according to IS (intrinsic or intrinsically safe) guidelines when utilized in hazardous areas of an industrial or other process/system.

The flow transmitter system 100 can include a transmitter 110 and a flow sensor 112. The flow sensor 112 can sense flow characteristics of a moving medium, and generate or derive sensor measurements (or signals thereof) associated with the sensed flow characteristics or sensed conditions. In various embodiments, the flow sensor 112 can be a vortex flow sensor or other pulse-based sensor.

The transmitter 110 can receive sensor measurements from the flow sensor 112, can process and communicate information associated with the sensor measurements to one or more remote devices or systems, and can perform other operations including but not limited to diagnostic operations of the flow transmitter system 100 and components thereof. The transmitter 110 can include a sensor interface 120, media unit 130, pulse output circuit(s) 140 and interface(s) 150 for connecting components of the flow transmitter system 100 to external devices and systems. The interface 150 can include a plurality of connections or connectors for power and communications.

The sensor interface 120 is connected to the flow sensor 112, and performs signal and other processing (e.g., signal conditioning, A/D signal conversion, etc.) on the signals outputted and received from the flow sensor 112. The signals can include sensor measurements of flow characteristics of the monitored medium. In this example, the sensor interface 120 includes a processor(s) 122 to process the signals from the flow sensor 112 and to perform and control various operations of the flow transmitter system 100. In various embodiments, the processor 122 can be configured to output a drive signal for driving the pulse output circuit 140 to generate and output a pulse signal(s) corresponding to the sensor measurements of the flow characteristics, to conduct communication with remote devices or systems via the media unit 130, to perform diagnostics on the flow transmitter system 100 and components thereof using information for example gathered from various sensors or monitoring circuits such as diagnostic circuit 142 and sensor and monitor circuits 144, to send a report including but not limited to an alarm or other alert regarding the operational state of the flow transmitter system 100 or its components, and to perform and control other operations of the flow transmitter system 100 including those described herein. The diagnostics can include determination of whether the flow transmitter system 100 or components thereof (including but not limited to the pulse output circuit 140) are operating in a normal or abnormal state (e.g., normally within acceptable parameters or abnormally outside of acceptable parameters). Although the processor 122 is shown in this example as being part of the sensor interface 120, the processor 122 can be arranged in different locations or configurations in the transmitter 110.

The media unit 130 can include power components (e.g., power converter(s), buses/connectors, etc.) for supplying power from a power supply to one or more components of the flow transmitter system 100, and communication components (e.g., communications device(s), transmitter/receiver, etc.) for conducting analog or digital communication with other devices or systems, such as external control and monitoring equipment 170 of an industrial process or system. The external control and monitoring equipment can include other equipment in an industrial process or system which may utilize, monitor or process sensor measurement information gathered by the flow transmitter system 100, an industrial control system (ICS), an intelligent electronic device (IED) such as for example employed in an ICS, a user device (e.g., computer, smartphone, etc.) and so forth. In this example, one of the power supplies can be provided from an external source such as the external control and monitoring equipment 170; however, a power supply can be provided locally (e.g., battery, etc.) depending on the application. In various embodiments, the communication components of the media unit 130 can provide communications, such as HART and 4 to 20 mA analog signal or Modbus digital signal, or other communication across other mediums using various protocols depending on the application.

The pulse output circuit 140 can generate electrical pulse signal(s) according to the drive signals from the processor 122. In various embodiments, the pulse output circuit 140 can include a switching circuit, such as for example, transistor(s) or transistor circuit or other electronic switching element(s), for generating a pulse signal(s). The pulse output circuit 140 also can include insolation circuits, current limiting circuits or other protection circuits (e.g., transient protection, etc.) for safety, such as intrinsic safety (IS), when operating in hazardous environments. In this example, the pulse output circuit 140 can require connection of an external power supply to generate pulse signal(s). As shown, an external device 160 with a power supply 162 can be connected to the pulse output circuit 140, via interface 150, to supply power to the pulse output circuit 140 and to receive pulse signal(s) generated or outputted by the pulse output circuit 140. The external device 160 can be or operate as an electronic switch or relay, or other device employed in an industrial or other process/system.

The pulse output circuit 140 also can include a diagnostic circuit 142 for monitoring the pulse signal(s) and feeding back information corresponding thereto, when the external device 160 and its power supply 162 is connected to the pulse output circuit 140. In some embodiments, the diagnostic circuit 142 can provide diagnostic information about the installation and operation of external equipment connected to the flow transmitter system 100. The diagnostic circuit 142 can monitor current or current measurement corresponding to the pulse signal(s), which is generated by the pulse output circuit 140 and provided to the external device 160. In various embodiments, the diagnostic circuit 142 can include, for example, an amplifier(s) or amplification circuitry, which is added/coupled to or integrated with the pulse output circuit 140. The diagnostic circuit 140 can sample and amplify a current signal corresponding to the pulse signal(s) on the pulse output circuit or the switch circuit of the pulse output circuit 140, which is powered by the power supply 162 of the external device 160. The diagnostic circuit 140 can also convert the monitored current signal to a corresponding voltage signal, perform analog-to-digital conversion of a signal, and other signal conditioning or processing.

The other sensor(s) or monitoring circuits 144 can include sensors/circuits for monitoring and checking power from the power supplies, monitoring and checking a connection state of connections on the interface 150, and/or monitoring or checking other aspects of the flow transmitter system 100 or components thereof including those described herein.

Figure 2:
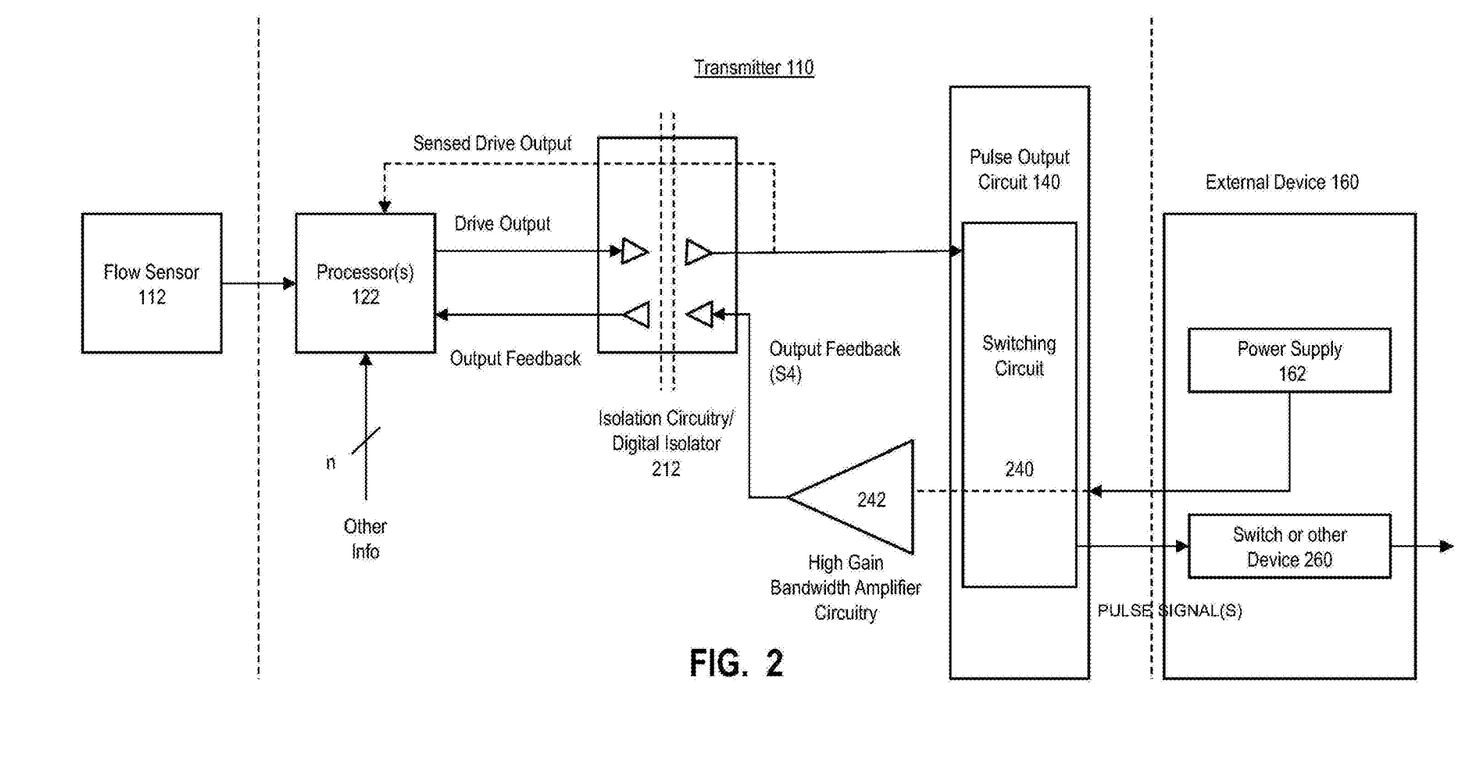
FIG. 2 illustrates a block diagram of the pulse output and diagnostic features of the transmitter of the flow transmitter system, in accordance with an embodiment.

FIG. 2 illustrates a block diagram of example components of the transmitter 110 associated with diagnostic operations of a flow transmitter system (e.g., 100), in accordance with an embodiment. As shown in FIG. 2, the processor 122 can receive sensor measurement of the monitored flow characteristics from the flow sensor 112, and generate a switching pulse output that is proportional to sensor measurement to drive the switching circuit 240 of the pulse output circuit 140, across a digital isolator 212 (e.g., isolation circuitry). The switching circuit 240 can include transistor(s) or other switching elements. In this example, the pulse output circuit 140 or transmitter 110 can include an intrinsically safe digital isolator, intrinsically safe output circuit and transient protection. The output of the switching circuit 240 is available as an isolated pulse output (e.g., isolated pulse signal(s)) to an external device 160, such as an external switch 260 that can be connected to the flow transmitter system 100 using the external power supply 162. A diagnostic circuit 242 of high gain bandwidth amplifier(s) or amplification circuitry is added to the pulse output circuit 140, and can detect current flow through the external device 160 when connected to the transmitter 110 or its components. The diagnostic circuit 242 can convert the current flow to a voltage signal, amplify the voltage signal and convert the amplified voltage signal to a digital signal to feedback to the processor 122 through the digital isolator 212. This feedback signal to the processor 122 can then be compared to the outgoing pulse drive signal and evaluated by the processor 122 to check if there is an error or problem with the outputted pulse signal from the pulse output circuit 140.

In various embodiments, the switching circuit 240 of the pulse output circuit comprises at least one transistor (e.g., FET, bipolar transistor, etc.) which is powered by the power supply 162 of the external device 160 and driven according to the drive signal from the processor 122. The feedback signal from the diagnostic circuit 242 can correspond to current drawn from the power supply 162 of the external device 160 when the at least one transistor is driven to turn or switch ON and OFF to generate the pulse signal(s) according to the drive signal from the processor 122.

Figure 3:
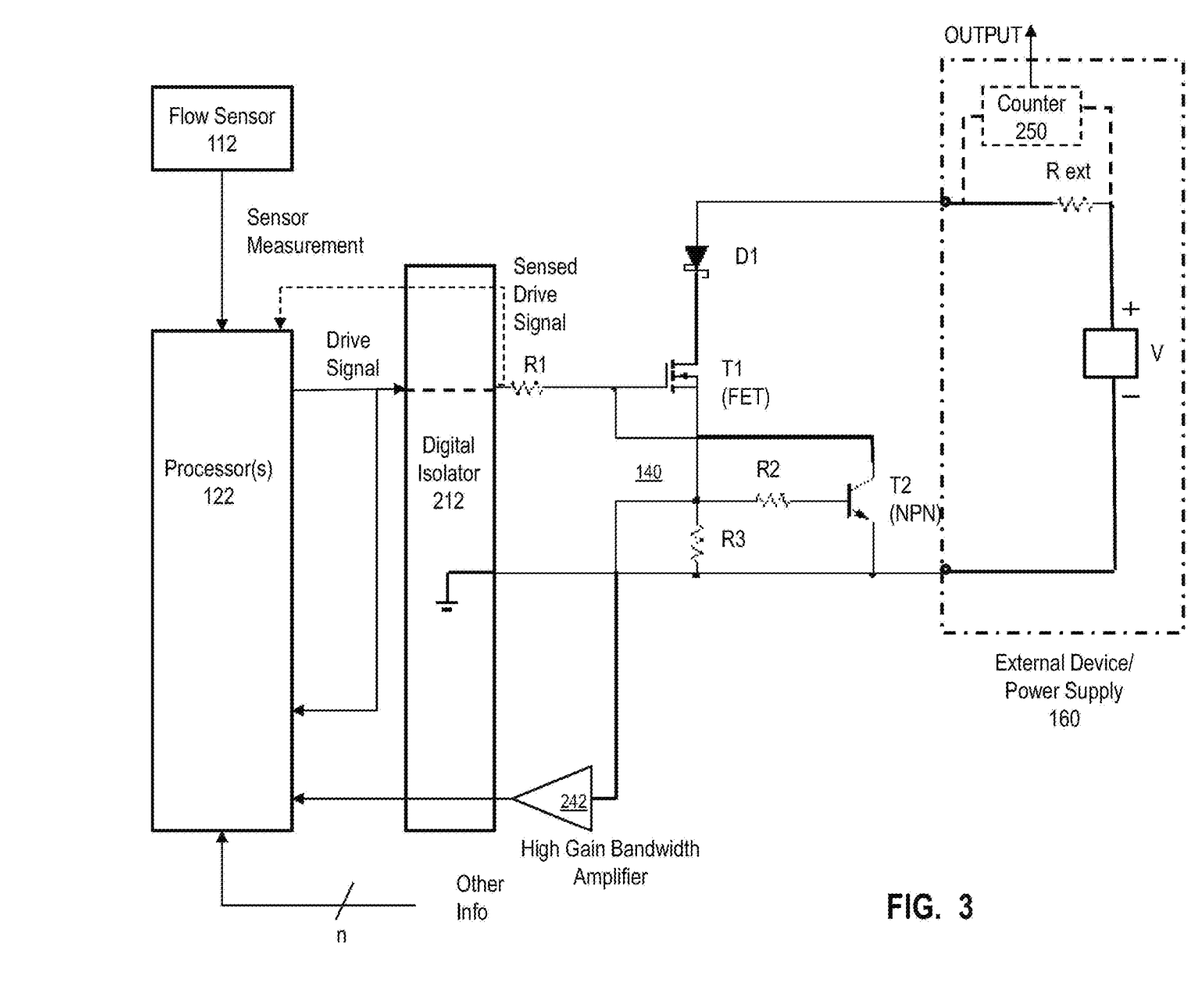
FIG. 3 illustrates an example pulse output circuit including a diagnostic circuit for monitoring current or current measurement corresponding to pulse signal(s) outputted from the transmitter, in accordance with an embodiment.

FIG. 3 illustrates an example pulse output circuit 140 including diagnostic circuit for monitoring current or current measurement corresponding to pulse signal(s) outputted from the transmitter, in accordance with an embodiment. In this example, the pulse output circuit 140 can employ a FET transistor (T1) as the switching element, and resistors (R1-R3) and NPN transistor (T2) to provide intrinsically safe output circuit and transient protection. The external device 160 can include a power supply (e.g., a DC voltage supply V) and a current limiting resistor (R ext). The external device 160, when connected to the pulse out circuit of the transmitter, can provide an electronic switching device which can obtain and output pulse information corresponding to sensor measurement(s) from a sensor. In operation, when the external device 160 and its power supply is connected to the pulse output circuit 140, the processor 122 can receive sensor measurement of the monitored flow characteristics from the flow sensor 112, and generate a switching pulse output that is proportional to the sensor measurement to drive the FET (T1) of the pulse output circuit 140, across a digital isolator 212 (e.g., isolation circuitry). The output of FET (T1) is available as an isolated pulse output (e.g., isolated pulse signal(s)) to an external device 160, such as an external switch, that can be connected to the flow transmitter system 100 using the external power supply 162. A diagnostic circuit 242 of high gain bandwidth amplifier(s) or amplification circuitry is added to the pulse output circuit 140, and can detect current flow through the external device 160 when connected to the transmitter 110 or its components. The diagnostic circuit 242 can convert the current flow to a voltage signal, amplify the voltage signal and convert the amplified voltage signal to a digital signal to feed back to the processor 122 through the digital isolator 212. This feedback signal to the processor 122 can then be compared to the outgoing pulse drive signal and evaluated by the processor 122 to check if there is an error or problem with the outputted pulse signal from the pulse output circuit 140.

As further shown in FIG. 3, the external device 160 can also include a counter 250 connected across the resistor (R ext), and is configured to output a pulse count corresponding to the pulse output or signal. The output from the counter 250 can be outputted to a recorder, to an instrument for use in performing compensation, or to other device(s) or system(s) for monitoring, checking and/or controlling the operations in a process or system (or components thereof).

Figure 4:
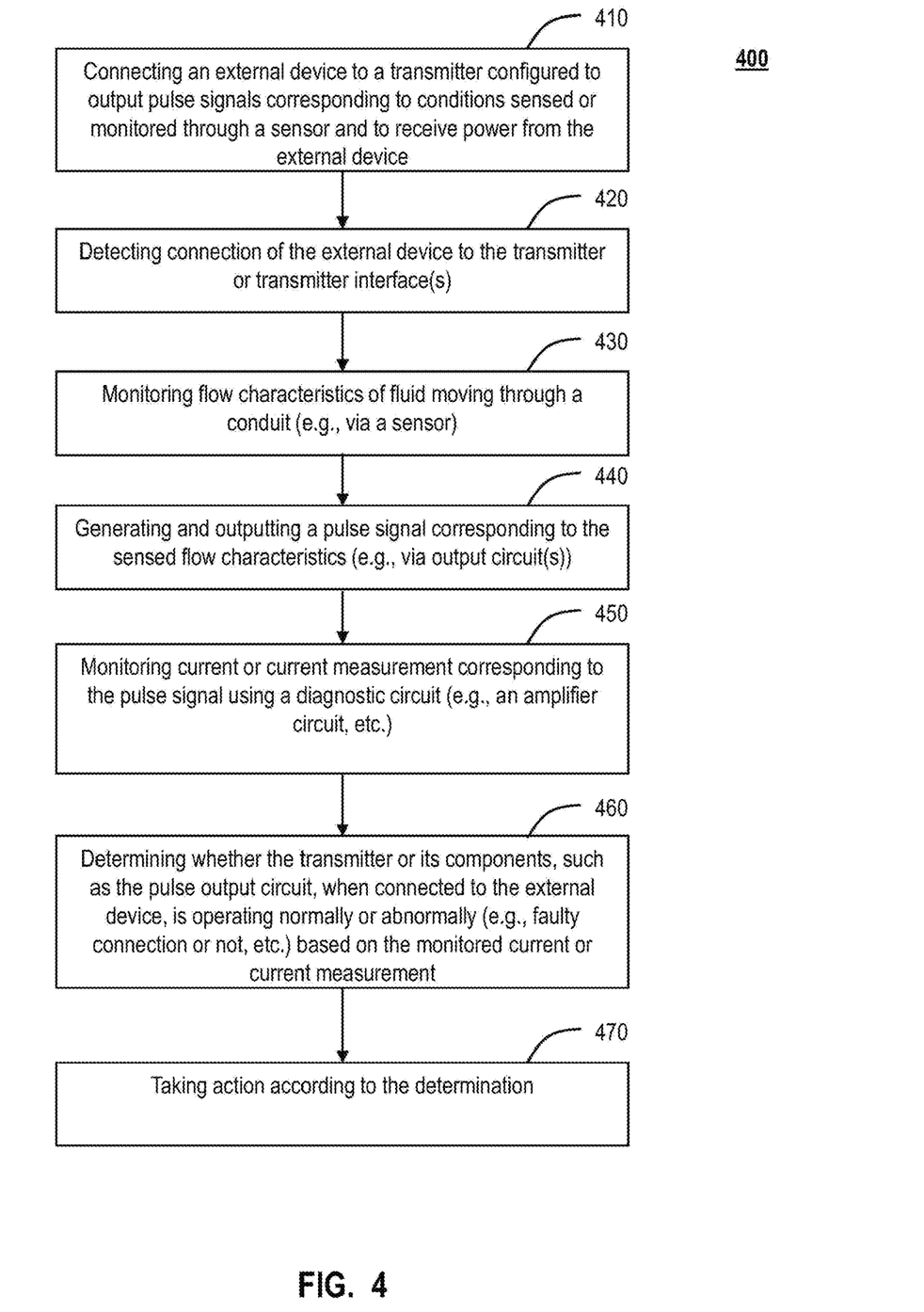
FIG. 4 illustrates an example method of performing diagnostics of the flow transmitter system or components thereof in accordance with an exemplary embodiment.

FIG. 4 illustrates an example method 400 of performing sensor diagnostics in accordance with an exemplary embodiment. The method 400 will be described with reference to a flow transmitter system with a transmitter and a sensor. Examples of a flow transmitter system and its components are shown and described in FIGS. 1-3. In this example, the transmitter includes a processor for performing or controlling the operations of the flow transmitter system and components thereof. The transmitter also includes a pulse output circuit which is configured to output pulse signal(s) corresponding to sensor measurements that are sensed or derived by the sensor, such as a flow sensor or other pulse-based sensor. The pulse output circuit can receive power from the external device, which can include a power supply.

The method 400 begins at block 410 in which an external device with a power supply is connected to a transmitter of a flow transmitter system. When connected, the external device can supply power to the pulse output circuit.

At block 420, connection of the external device to the transmitter, components of the transmitter such as the pulse output circuit, or transmitter interface(s), can be detected (or monitored) using one or more sensors or monitoring circuits. The connected power supplies can also be monitored and checked using one or more sensors or monitoring circuits.

At block 430, flow characteristics (or conditions) of a medium is monitored using the sensor. The medium can be a moving fluid and/or gas in a conduit or other structure, or other moving material(s). The sensor measurements of the monitored flow characteristics are outputted by the sensor.

At block 440, a pulse signal(s) is generated and output using a pulse output circuit. The pulse signal corresponds to the sensor measurements from the sensor. For example, the processor can obtain the sensor measurements from the sensor, and drive the pulse output circuit with a pulse output, e.g., a drive signal, according to the sensor measurements. In this way, the generated pulse signal corresponds to the sensor measurements, and thus, the monitored flow characteristics from the sensor.

At block 450, current or current measurement corresponding to the pulse signal(s) are monitored using a diagnostic circuit, which can be added or integrated to the pulse output circuit. As previously explained, the diagnostic circuit can be connected to the switching circuit of the pulse output circuit, and can include an amplifier(s) or amplification circuitry, such as high bandwidth amplifier(s) or amplification circuitry. The diagnostic circuit can feedback to the processor information corresponding to the monitored current for use in performing sensor diagnostics. In various embodiments, the diagnostic circuit can convert the monitored current to a corresponding voltage signal, which is amplified and converted to digital form for feedback to the processor.

At block 460, a determination can be made on whether the transmitter or its components, such as the pulse output circuit, when connected to the external device, is operating in a normal or abnormal state. The determination can be made based on a comparison of the drive signal from the processor and the information feedback by the diagnostic circuit corresponding to the monitored current or current measurement. For example, a potential fault or error is detected when the drive signal from the processor and the feedback signal from the diagnostic circuit do not match. The determination can help to identify faulty connections, pulse rate errors, or other potential problems associated with the pulse output circuit and generation of a pulse signal. In various embodiments, the determination of a normal and abnormal state can be based on a plurality of determinations of an abnormal state or a normal state taken over a predetermined period of time and/or predetermined number of instances.

At block 470, action(s) can be taken according to the determination (e.g., abnormal state or normal state). For example, the processor can provide a report or notification of the connection state (abnormal or normal) or other operating state of the transmitter, transmitter components such as the output circuit, and/or external device. The report can be transmitted, via the media unit of the transmitter, to a remote device or system such as external control or monitoring equipment, a central control or monitoring facility, or to designated personnel. After determination of an abnormal state, additional diagnostics may also be performed on the flow transmitter system or components thereof.

Figure 5:
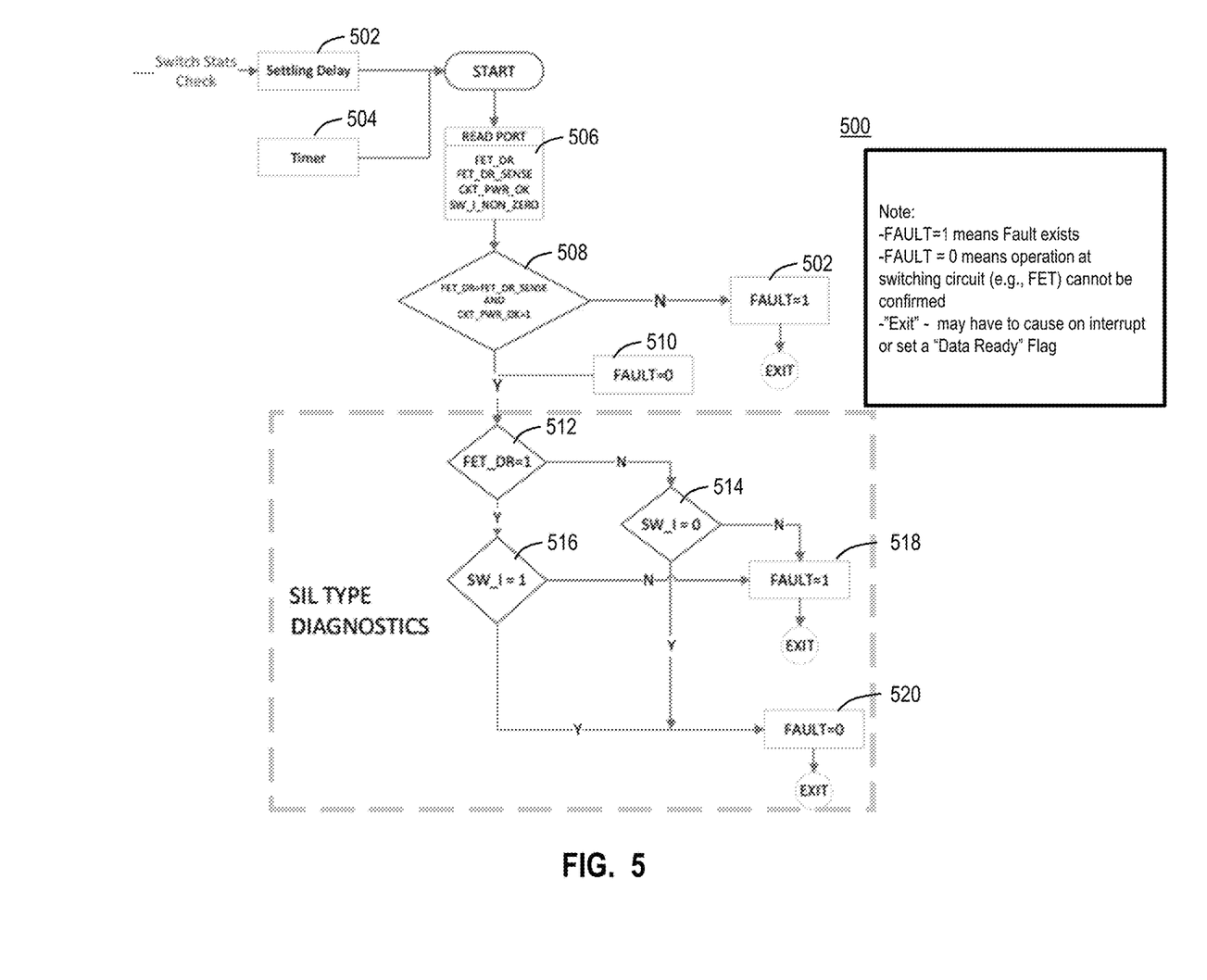
FIG. 5 illustrates an example method of performing diagnostics of the flow transmitter system or components thereof in accordance with an exemplary embodiment.

FIG. 5 illustrates an example method 500 of performing sensor diagnostics in accordance with an exemplary embodiment. The method 400 will be described with reference to a flow transmitter system with a transmitter and flow sensor, such as described in the example of FIG. 3. In this example, the transmitter includes a processor for performing or controlling the operations of the flow transmitter system and components thereof. The transmitter also includes a pulse output circuit which is configured to generate or output pulse signal(s) corresponding to sensor measurements that are sensed or derived by a sensor, such as a flow sensor or other pulse-based sensor. In the example of FIG. 3, the pulse output circuit employs an FET transistor as the switching element for use in generating a pulse signal. The pulse output circuit can receive power from the external device, which can include a power supply.

The method 500 begins at blocks 502 and 504 with the initialization of settling delay and timer. At block 506, various ports or inputs are initialized, read and checked, such as the drive signal outputted by the processor (e.g., FET_DR), the sensed or monitored drive signal outputted by the processor (e.g., FET_DR_SENSE), the sensed or monitored check on power suppl(ies) connected to the flow transmitter system or components thereof (e.g., CKT_PWR_OK), and the sensed or monitored current corresponding to the pulse signal (e.g., SW_I_NON_ZERO).

At block 508, the processor checks whether (1) the outputted drive signal (e.g., FET_DR) matches the sensed drive signal (e.g., FET_DR_SENSE), and (2) the power suppl(ies) to the pulse output circuit (or other transmitter components) are operating within acceptable norms (e.g., CKT_PWR_OK=1). The power supplies(s) can be monitored using a transformer or other power monitoring circuit. If the outputted and sensed drive signal does not match or the power supply is not operating within acceptable norms, the processor determines that a fault or error exists (e.g., FAULT=1) at block 502. Otherwise, if the outputted and sensed drive signal does match and the power supply is operating within acceptable norms, the processor determines that there is no fault or error (e.g., FAULT=0) at block 510.

After block 510, the transmitter and its processor can implement a Safety Integrity Level (SIL) type diagnostics, which can involve comparing the outputted drive signal (e.g., FET_DR) to the monitored current or current measurement, corresponding to the pulse signal, from the switching element (e.g., FET (T1)) of the pulse output circuit. For example, at block 512, the processor checks whether the drive signal is HIGH (e.g., FET_DR=1). If the drive signal is not HIGH, the processor checks if the monitored current or current measurement is LOW (e.g., SW_I=0) at block 514. If the monitored current or current measurement is not LOW or, in other words, the monitored current or current measurement does not match the drive signal, the processor determines that a fault or error exists (e.g., FAULT=1) at block 518. Otherwise, if the monitored current or current measurement is LOW or, in other words, the monitored current or current measurement matches the drive signal, the processor determines that there is no fault or error (e.g., FAULT=0) at block 520

At block 512, if the drive signal is HIGH (e.g., FET_DR=1), the method 500 proceeds to block 516. At block 516, the processor checks whether the monitored current or current measurement is HIGH (e.g., SW_I=1). If the monitored current or current measurement is LOW or, in other words, the monitored current or current measurement does not match the drive signal, the processor determines that a fault or error exists (e.g., FAULT=1) at block 518. Otherwise, if the monitored current or current measurement is HIGH or, in other words, the monitored current or current measurement matches the drive signal, the processor determines that a fault or error exists (e.g., FAULT=0) at block 520.

In various embodiments, the determination of the SIL type diagnostics can be checked over a period of time or over a number of instances to confirm the existence of a fault or no fault.

The diagnostic system and method, as described herein, may be employed or implemented with an external device that supplies power to a component of the flow transmitter system, such as for example the pulse output circuit, when connected thereto. The diagnostic system and method also may be employed in other power configurations including but not limited to the use of a local or other power supply to supply power to the pulse output circuit or other components of the flow transmitter system. Furthermore, the diagnostic system and method may be employed in a flow transmitter or other measuring system to support custody transfer applications or other applications employing flow sensors. For example, the diagnostic system and method may be implemented to determine whether totalizing equipment is disconnected or not. In some embodiments, the diagnostic system and method can be implemented in a specific application, e.g. a 5 volt rated load, which may be supplied by the measuring system such as for example 4-20 ma.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

A processor(s) or controller(s) as described herein can be a processing system, which can include one or more processors, such as CPU, controller, or other processing unit or circuitry, which controls, processes signals or performs the operations of the devices or systems, described herein. Memory/storage devices can include, but are not limited to, disks, solid state drives, optical disks, removable memory devices such as smart cards, SIMS, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A method of performing diagnostic of a flow transmitter system, comprising:
   obtaining, via a flow sensor, sensor measurements of flow characteristics of a moving medium being monitored;
   outputting, via at least one processor, a drive signal for driving a pulse output circuit to generate a pulse signal according to the sensor measurements from the flow sensor;
   generating, via a switching circuit of the pulse output circuit, a pulse signal according to the drive signal;
   monitoring, via a diagnostic circuit connected to the switching circuit, current corresponding to the pulse signal; and
   determining, via the at least one processor, whether the pulse output circuit is operating in a normal or abnormal state based on the drive signal from the at least one processor and a feedback signal corresponding to the monitored current from the diagnostic circuit,
   wherein the pulse signal is outputted to or obtained by an external device with a power supply which supplies power to the pulse output circuit when connected to the flow transmitter system,
   wherein the switching circuit of the pulse output circuit comprises at least one transistor which is powered by the power supply of the external device and driven according to the drive signal from the at least one processor,
   wherein the diagnostic circuit comprises a circuit of high gain bandwidth amplifier or amplifiers for providing the feedback signal to the at least one processor, the feedback signal corresponding to current drawn from the power supply of the external device when the at least one transistor is driven to turn or switch ON and OFF according to the drive signal from the at least one processor.

2. The method according to claim 1, wherein the determining operation compares the drive signal from the at least one processor to the feedback signal corresponding to the monitored current from the diagnostic circuit to determine whether the pulse output circuit is operating in a normal or abnormal state.

3. The method according to claim 1, further comprising:
   conducting communication with a remote device via a communication device of the flow transmitter system which is separate from the pulse output circuit, the at least one processor being configured to selectively output information corresponding to the sensor measurement via the communication device or via the pulse output circuit,
   wherein the at least one processor, the flow sensor and the communication device are powered by a power supply that is different from the power supply of the external device.

4. The method according to claim 1, wherein the pulse output circuit comprises:
   the switching circuit for generating pulse signal(s), and
   protection circuitry comprising isolation and/or current limiting circuits for intrinsically safe operations.

5. The method according to claim 1, wherein the at least one processor determines whether the pulse output circuit is operating in a normal or abnormal state in order to verify a rate of the pulse signal output to an external device or to determine a health of a connection of the external device to the flow transmitter system or components thereof, the method further comprising:
   reporting, via a communication device, to a remote device or system information regarding a faulty output pulse circuit or a faulty connection to the external device, based on the determination by the at least one processor.

6. The method according to claim 1, wherein the flow characteristics comprises a flow rate of the moving medium or a density of the moving medium.

7. A flow transmitter system comprising:
a flow sensor for obtaining sensor measurements of flow characteristics of a moving medium being monitored;
a pulse output circuit having a switching circuit for generating a pulse signal according to a drive signal;
a diagnostic circuit connected to the switching circuit, for monitoring current corresponding to the pulse signal; and
at least one processor configured
to output the drive signal for driving the pulse output circuit to generate a pulse signal according to the sensor measurements from the flow sensor, and
to determine whether the pulse output circuit is operating in a normal or abnormal state based on the drive signal from the at least one processor and a feedback signal corresponding to the monitored current from the diagnostic circuit,
wherein the pulse signal is outputted to or obtained by an external device with a power supply which supplies power to the pulse output circuit when connected to the flow transmitter system,
wherein the switching circuit of the pulse output circuit comprises at least one transistor which is powered by the power supply of the external device and driven according to the drive signal from the at least one processor,
wherein the diagnostic circuit comprises a circuit of high gain bandwidth amplifier or amplifiers for providing the feedback signal to the at least one processor, the feedback signal corresponding to current drawn from the power supply of the external device when the at least one transistor is driven to turn or switch ON and OFF according to the drive signal from the at least one processor.

8. The flow transmitter system according to claim 7, wherein the at least one processor is configured to compare the drive signal from the at least one processor to the feedback signal corresponding to the monitored current from the diagnostic circuit to determine whether the pulse output circuit is operating in a normal or abnormal state.

9. The flow transmitter system according to claim 7, further comprising:
a communication device for conducting communication with a remote device, the communication device being separate from the pulse output circuit, the at least one processor being configured to selectively output information corresponding to the sensor measurement via the communication device or via the pulse output circuit,
wherein the at least one processor, the flow sensor and the communication device are powered by a power supply that is different from the power supply of the external device.

10. The flow transmitter system according to claim 7, wherein the pulse output circuit comprises:
the switching circuit for generating pulse signal(s), and
protection circuitry comprising isolation and/or current limiting circuits for intrinsically safe operations.

11. The flow transmitter system according to claim 7, wherein the at least one processor determines whether the pulse output circuit is operating in a normal or abnormal state in order to verify a rate of the pulse signal output to an external device or to determine a health of a connection of the external device to the flow transmitter system or components thereof,
wherein the at least one processor is further configured to report, via a communication device, to a remote device or system information regarding a faulty output pulse circuit or a faulty connection to the external device, based on the determination by the at least one processor.

12. The flow transmitter system according to claim 7, wherein the flow characteristics comprises a flow rate of the moving medium or a density of the moving medium.

13. A tangible computer medium storing computer executable code, which when executed by one or more processors, is configured to implement a method of performing diagnostic of a flow transmitter system, the method comprising:
obtaining, via a flow sensor, sensor measurements of flow characteristics of a moving medium being monitored;
outputting, via at least one processor, a drive signal for driving a pulse output circuit to generate a pulse signal according to the sensor measurements from the flow sensor;
generating, via a switching circuit of the pulse output circuit, a pulse signal according to the drive signal;
monitoring, via a diagnostic circuit connected to the switching circuit, current corresponding to the pulse signal; and
determining, via the at least one processor, whether the pulse output circuit is operating in a normal or abnormal state based on the drive signal from the at least one processor and a feedback signal corresponding to the monitored current from the diagnostic circuit,
wherein the pulse signal is outputted to or obtained by an external device with a power supply which supplies power to the pulse output circuit when connected to the flow transmitter system,
wherein the switching circuit of the pulse output circuit comprises at least one transistor which is powered by the power supply of the external device and driven according to the drive signal from the at least one processor,
wherein the diagnostic circuit comprises a circuit of high gain bandwidth amplifier or amplifiers for providing the feedback signal to the at least one processor, the feedback signal corresponding to current drawn from the power supply of the external device when the at least one transistor is driven to turn or switch ON and OFF according to the drive signal from the at least one processor.

* * * * *